(12) United States Patent
Davis et al.

(10) Patent No.: US 7,284,263 B2
(45) Date of Patent: Oct. 16, 2007

(54) RIGHTS MANAGEMENT INTER-ENTITY MESSAGE POLICIES AND ENFORCEMENT

(75) Inventors: Malcolm H. Davis, Kirkland, WA (US); Peter D. Waxman, Bellevue, WA (US); John Gerard Speare, Spokane, WA (US); Roy Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/531,780

(22) Filed: Sep. 14, 2006

(65) Prior Publication Data

US 2007/0011750 A1 Jan. 11, 2007

Related U.S. Application Data

(62) Division of application No. 10/810,068, filed on Mar. 26, 2004, now Pat. No. 7,181,761.

(51) Int. Cl.
G06F 17/00 (2006.01)
G06F 12/00 (2006.01)
H04K 1/00 (2006.01)
H04L 9/00 (2006.01)
G06F 11/30 (2006.01)
G06F 12/14 (2006.01)
H04L 9/32 (2006.01)

(52) U.S. Cl. .............. 726/1; 726/24; 726/29; 713/153; 713/188; 705/51; 705/59; 709/206

(58) Field of Classification Search .............. 726/1, 726/29; 705/51, 59; 709/206; 713/153
See application file for complete search history.

(56) References Cited

U.S. PATENT DOCUMENTS

| | | | |
|---|---|---|---|
| 5,204,897 A | 4/1993 | Wyman | |
| 6,263,313 B1 | 7/2001 | Milsted et al. | 705/1 |
| 6,327,652 B1 | 12/2001 | England et al. | 713/2 |
| 6,330,670 B1 | 12/2001 | England et al. | 713/2 |
| 6,345,256 B1 | 2/2002 | Milsted et al. | 705/1 |
| 6,389,403 B1 | 5/2002 | Dorak, Jr. | 705/52 |
| 6,418,421 B1 | 7/2002 | Hurtado et al. | 705/54 |
| 6,502,137 B1 | 12/2002 | Peterson et al. | 709/229 |
| 6,587,837 B1 | 7/2003 | Spagna et al. | 705/26 |
| 6,597,891 B2 | 7/2003 | Tantawy et al. | 455/3.05 |

(Continued)

OTHER PUBLICATIONS

J. Watkins, "*Copearms and Erms: Co-Operation in Rights Management in the Electronic Environment*," The New Review of Information Networking, vol. 4, 1998, pp. 127-133.

L.C. Anderson and J.B. Lotspiech, "*Rights Management and Security in the Electronic Library*," Bulletin of the American Society for Information Science, vol. 22, No. 1, Nov. 1995, pp. 21-23.

*Primary Examiner*—Kambiz Zand
*Assistant Examiner*—Michael J Simitoski
(74) *Attorney, Agent, or Firm*—Workman Nydegger

(57) ABSTRACT

The present invention provides the ability to compare and enforce policies between trusted entities within a rights management system. For example, policies between the two entities may be received by either entity. They may then be compared to determine the compatibility of the two policies. If compatible, or maybe even without the comparison, other embodiments provide for message server use license, which allows access to the protected portion of a message, thereby permitting an entity to enforce its message policies.

16 Claims, 11 Drawing Sheets

U.S. PATENT DOCUMENTS

| | | |
|---|---|---|
| 6,609,199 B1 | 8/2003 | DeTreville .................. 713/172 |
| 6,611,841 B1 | 8/2003 | Han .......................... 707/102 |
| 2002/0007453 A1* | 1/2002 | Nemovicher ................ 713/155 |
| 2002/0007456 A1 | 1/2002 | Peinado et al. |
| 2002/0169954 A1* | 11/2002 | Bandini et al. ............. 713/153 |
| 2004/0054919 A1* | 3/2004 | Duri et al. .................. 713/200 |
| 2004/0125798 A1* | 7/2004 | Hondo et al. ............... 370/389 |
| 2004/0193915 A1* | 9/2004 | Smith et al. ................ 713/200 |
| 2005/0138353 A1* | 6/2005 | Spies et al. ................. 713/153 |

* cited by examiner

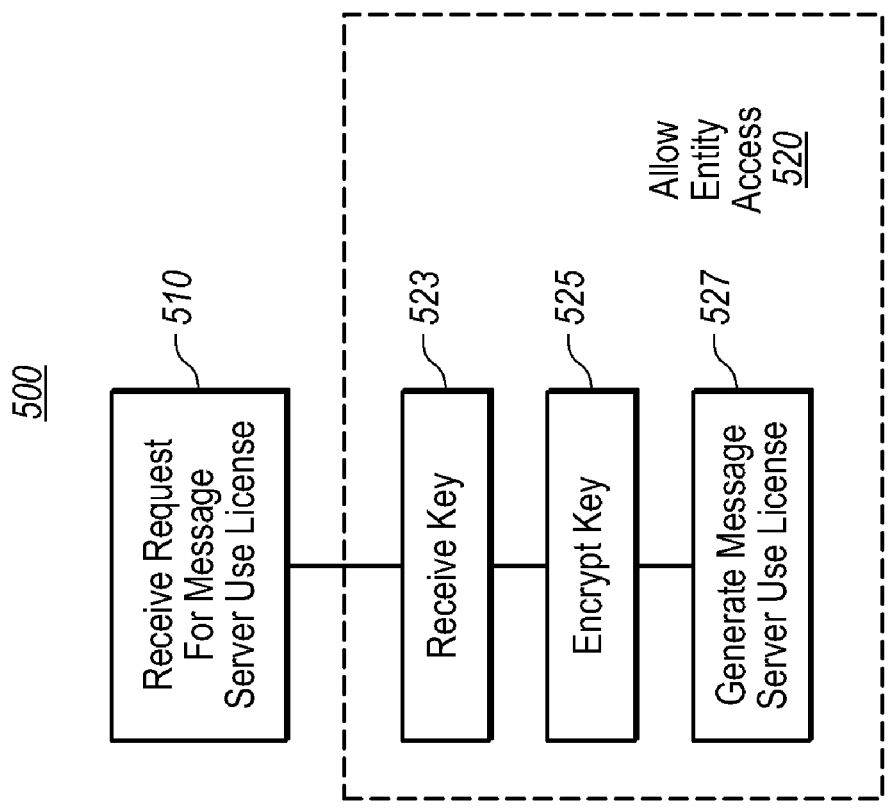

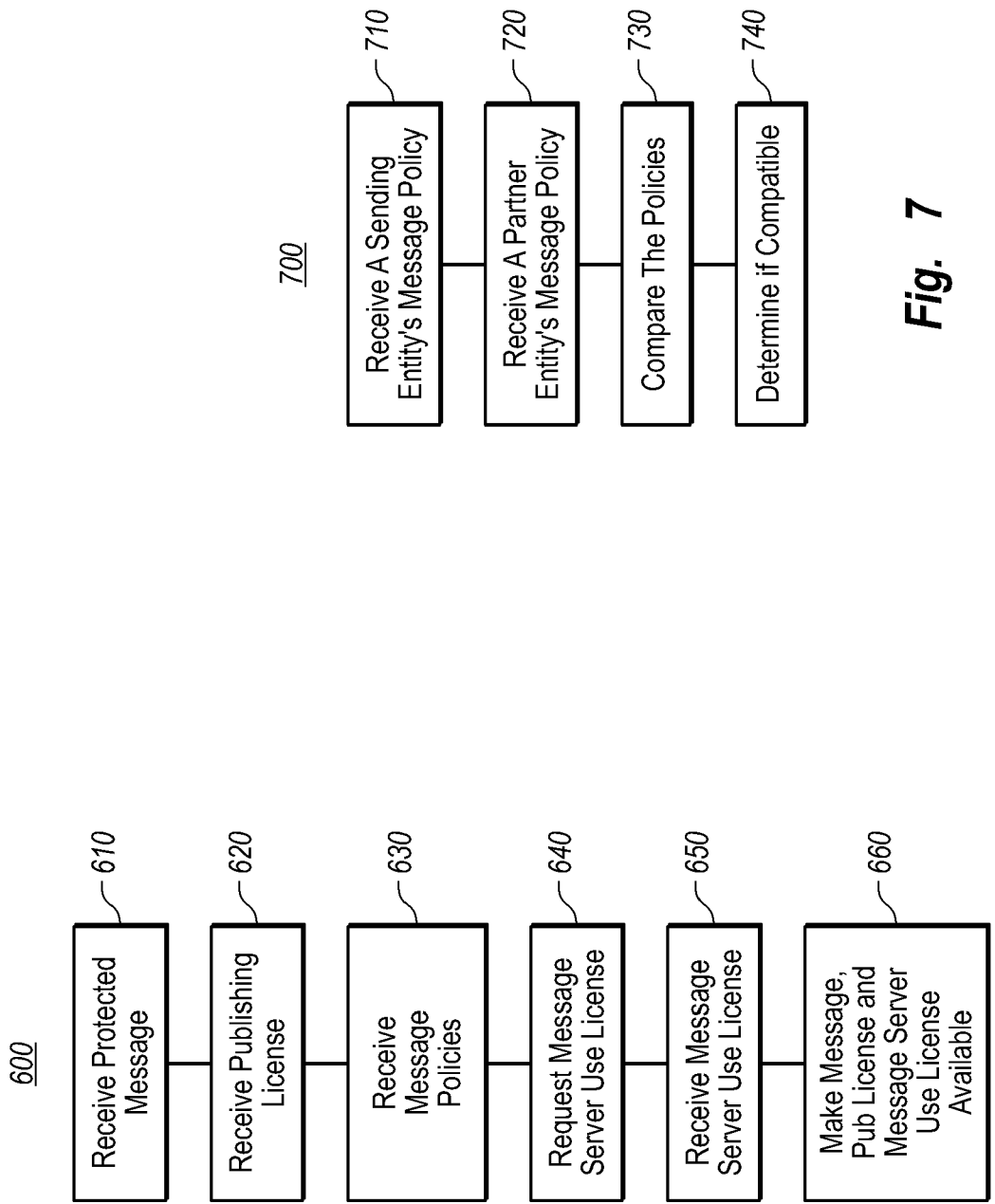

RIGHTS MANAGEMENT INTER-ENTITY MESSAGE POLICIES AND ENFORCEMENT

CROSS-REFERENCE TO RELATED APPLICATIONS

This is a divisional application of U.S. patent application Ser. No. 10/810,068 filed Mar. 26, 2004 now U.S. Pat. No. 7,181,761, which is incorporated herein by reference in its entirety.

BACKGROUND OF THE INVENTION

1. The Field of the Invention

The present invention generally relates to the distribution of protected message in a rights management s system. In particular, the present invention provides for the ability to compare and enforce policies between trusted entities.

2. Background and Related Art

Rights management services (RMS) provide software that protects ownership/copyright of electronic message by restricting what actions an authorized recipient may take in regard to that message. The term message as referred to herein is information and data stored in digital format including: pictures, movies, videos, music, programs, multimedia, games, documents, etc. A few of the primary functions of a RMS are to control licensing authorization so that message is unlocked only by authorized intermediate or end-users that have secured a license, and to control message usage according to the conditions of purchase or license or otherwise imposed by the author (e.g. permitted number of copies, number of plays, the time interval or term the license may be valid, or actions that may be performed on the message, such as further distribution, opening or accessing, printing, and the like). Another function of a RMS may be to identify the origin of unauthorized copies of message to further combat piracy.

Originally, the idea of rights management was used to protect against the on-line piracy of commercially marketed material such as digital periodicals, books, photographs, educational material, video, music, etc. The use of rights management, however, has become increasingly popular in the business setting to protect proprietary or confidential information within a business network. For example, a CEO of a large corporation may wish to distribute an e-mail that includes trade-secrets. Because of the confidential nature of this information, however, the CEO may wish to limit the actions recipients may take in regard to this message. For example, the CEO may wish to allow upper-level management to read, copy, print and save the confidential information; however, she may wish to limit other employees to read-only access or to no access at all. Accordingly, through the use of RMS the CEO can specify who is authorized to view the protected message and what actions they may take in regards thereto.

The above illustrates just one of many examples of the importance of controlling messages in a business network environment. Although rights management is becoming a popular tool in a business environment, there currently exist several drawbacks and deficiencies in the system. For example, when messages are exchanged between two organizations, each organization implements trust policies that specify the conditions each allows or requires to be performed on protected messages in order to establish a trust between the organizations. Establishing this trust is complex and typically involves manual intervention in many current RM systems. For instance, partner organizations must manually exchange RMS server certificates and policy information with each partner. Exchanging certificates and manually updating them when they expire can become extremely unmanageable, especially if an organization exchanges secure messages with a significant number of partner organizations. Further, there is currently no way to determined if the policies between the two organizations are compatible for sending and receiving protected messages.

There are other related problems associated with conventional RM-systems. For example, because messages whose access is controlled by RMS are typically encrypted from desktop to desktop, agents or servers have no access to the protected portions of the message. Accordingly, this prevents valuable operations such as anit-virus scanning, anti-spam filtering, search term indexing, etc. Without such features, RMS could become an unfettered method for distributing viruses, worms, Trojans and spam.

BRIEF SUMMARY OF THE INVENTION

In accordance with exemplary embodiments of the present invention, the above-identified drawbacks and deficiencies of current rights management service systems are overcome. For example, exemplary embodiments provide for a rights management system for protecting a message from unauthorized access that provides an entity the ability to enforce conditions under which the entity's message server will accept messages.

In one embodiment, data including a message with a protected portion controlled by a rights management server, a publishing license and a message server use license are received. The publishing license defines one or more principals' rights to the protected portion of the message, and the message server use license includes an encrypted key that corresponds to an entity's message server. The message server use license can be used to access the protected portion of the message for performing operations on the protected portion in accordance with message policies defined by the entity. If the protected portion of the message conforms to the message policies defined by the entity, the message and publishing license may then be made available to the one or more principals.

Other example embodiments provide a rights management system capable of generating a message server use license. A request is received for a message server use license that identifies an entity's message server. A key that allows access to a protected portion of a message controlled by a rights management server may also received. The key can then be encrypted to correspond with the entity's message server. A message server use license is then generated that includes the encrypted key. This allows the entity's message server access to the protected portion of the message when performing operations on the message in accordance with message policies defined by the entity.

Still other embodiments provide that at a sending entity's message server, a computer program product provides an entity the ability to enforce conditions under which the entity's message server will accept messages. A message with a protected portion being controlled by a rights management server is received. Further, a publishing license that includes rights available to one or more intended principals is received. The rights within the publishing license controlling the type of operations that can be performed on the protected portion of the message. Also received are entity message policies defined by the entity, which specify the operations that are to be performed on the message. A message server use license can be requested to allow the entity's message server access to the protected portion of the message. The requested message server use license that includes an encrypted key that corresponds to the entity's message server may then be received. Finally, the message, publishing license and message server use license is made available to the entity's message server such that the entity's message server can enforce the message policies defined by the entity.

Yet other embodiments provide a messaging system for transferring messages between two trusted entities that determines if a message can be transferred between the entities based on each others message policies. A sending entity's message policy is received, which defines the type of operations that a partner entity is allowed to perform on a protected portion of a message. The partner entity's message policy is also received, which defines the type of operations that are to be performed on the message before the partner entity's message server can accept the message. The sending entity's message policy is compared with the partner entity's message policy; and based on the comparison, it is determined if the policies are compatible for transferring the message between the sending and partner entities' message servers.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates example acts of providing an entity the ability to enforce conditions under which the entity's message server will accept messages in accordance with example embodiments;

FIG. 5 illustrates example acts of and steps for generating a message server use license in accordance with example embodiments;

FIG. 6 illustrates example acts of requesting and receiving a message server use license in accordance with example embodiments;

FIG. 7 illustrates example acts of determining if a message can be transferred between two trusted entities in accordance with example embodiments.

DETAILED DESCRIPTION OF THE PREFERRED EMBODIMENTS

The present invention extends to methods, systems and computer program products for comparing and enforcing policies between trusted entities. The embodiments of the present invention may comprise a special purpose or general-purpose computer including various computer hardware, as discussed in greater detail below.

Example embodiments provide for methods, systems, and computer program products for overcoming the deficiencies of other rights management service systems by providing a comparison and enforcement of policies between trusted entities. Accordingly, partner or external entity's (e.g., companies, organizations, small business, enterprises, etc.) can compare policies to determine if protected messages should be transferred or exchanged between partner entities. Further, example embodiments allow entities to perform operations on protected portions of messages in accordance with message policies they define. In any event, although the following examples will be described in the context of a messaging system (i.e., the process of sending protected messages via message servers), the present invention may also be applicable to other forms of protected messages or content such as shared folders, instant and/or text messaging, etc. As such, the examples described herein for the inter-entity policy comparison and enforcement are used for illustrative purposes only and are not meant to limit the scope of the present invention.

In order to participate in the rights management service a principal should be enrolled. Generally, the term principal is meant to be interpreted broadly to encompass a user, process, machine, server, client, or any other device or thing capable of performing the function referred to. There are, however, embodiments in which a specific type of principal is desired. For example, as discussed in greater detail below regarding the enrollment process of FIG. 1(a), it is typically a machine that enrolls by receiving a lockbox dll. In contrast, with reference to the enrollment process described in FIG. 1(b), a user or server normally enrolls by receiving a rights management account certificate (RAC), which is a digital certificate issued to each user or server by an RMS server that identifies the user or server to the RM system. Accordingly, even though example embodiments of the present invention are described in the context of a particular type of principal, the term principal nevertheless should retain the broad meaning described above.

Figure 1A:
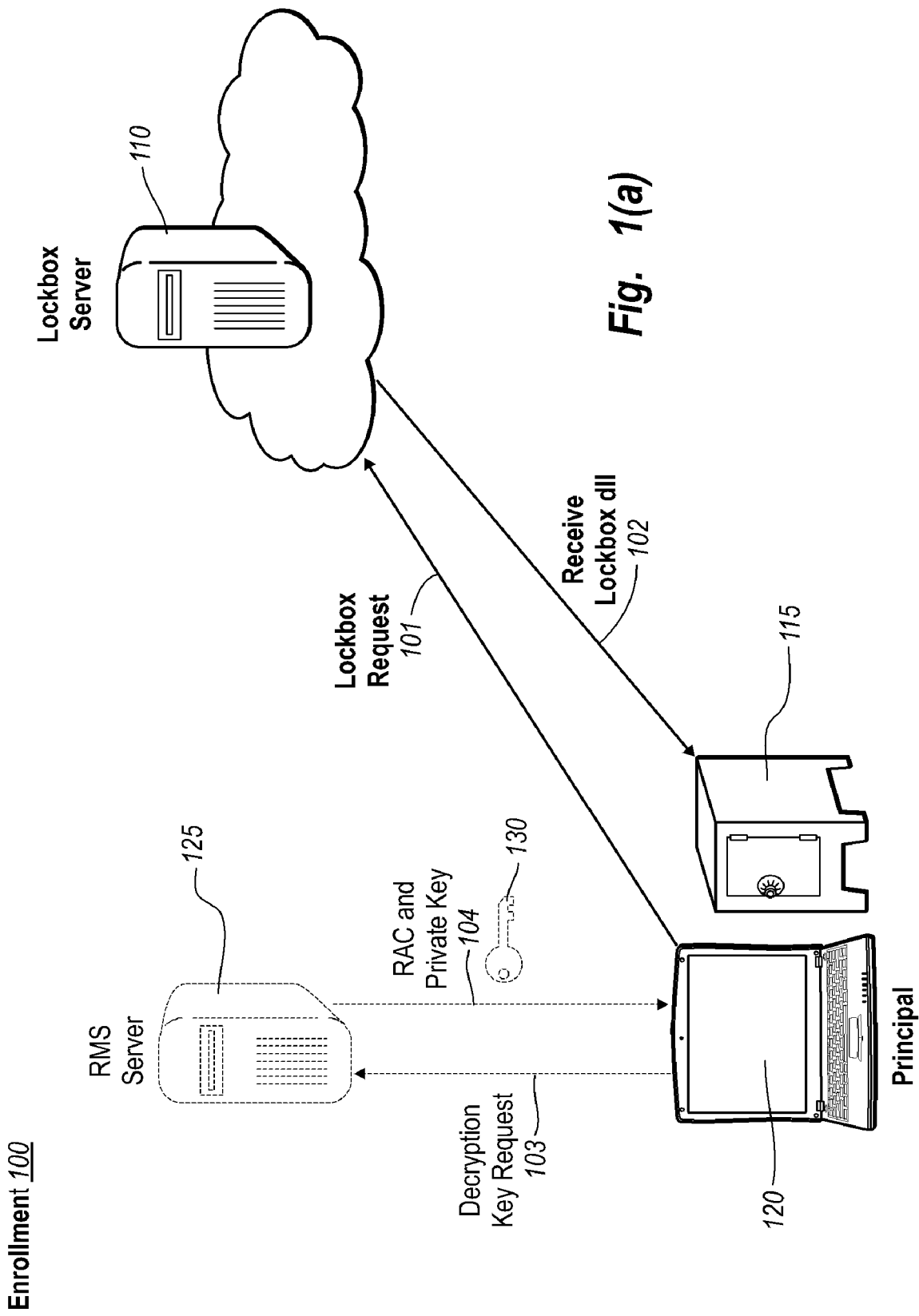
FIG. 1(a) illustrates an example of a user enrollment process for requesting and receiving software used to participate in the rights management system.

FIG. 1(a) highlights an example of a typical first action in the enrollment 100 process. A principal 120 (in particular a client or machine) should first obtain the appropriate software from a lockbox server 110. Accordingly, principal 120 sends a lockbox request 101 to lockbox server 110 and provides the lockbox server 110 with data unique to the machine. More particularly, the information provided may be physical characteristics of the machine, e.g. processor speed, CPU serial numbers, network addresses, etc. Lockbox server 100 uses this unique data to build a lockbox dll (dynamic link library) 115 and creates a machine certificate (not shown), both of which are then received in 102 by principal 120. As described in greater detail below, it is the lockbox dll 115 that will control access to protect messages. Further, because the lockbox dll 115 was built with unique data from the machine, the dll 115 is machine-specific such that it will only work on that particular machine. Lockbox 115 can check for the machine's characteristics as it runs.

Now that principal 120 has software to access protected messages, the principal 120 (in particular a user or server) registers with each rights management service (RMS) server that the principal 120 wishes to utilize. For example, if principal 120 wishes to participate in the rights management service for a particular business network, principal 120 register with the RMS server for that system. In other words, in order to access messages controlled from a specific RMS, the principal identifies itself with the RMS server. It should be noted, for purposes of the present invention, a RMS server represents one or more RMS servers and certain interactions, other than registration (e.g. obtaining a publishing or use license, as described below), may access any of the available RMS servers.

Figure 1B:
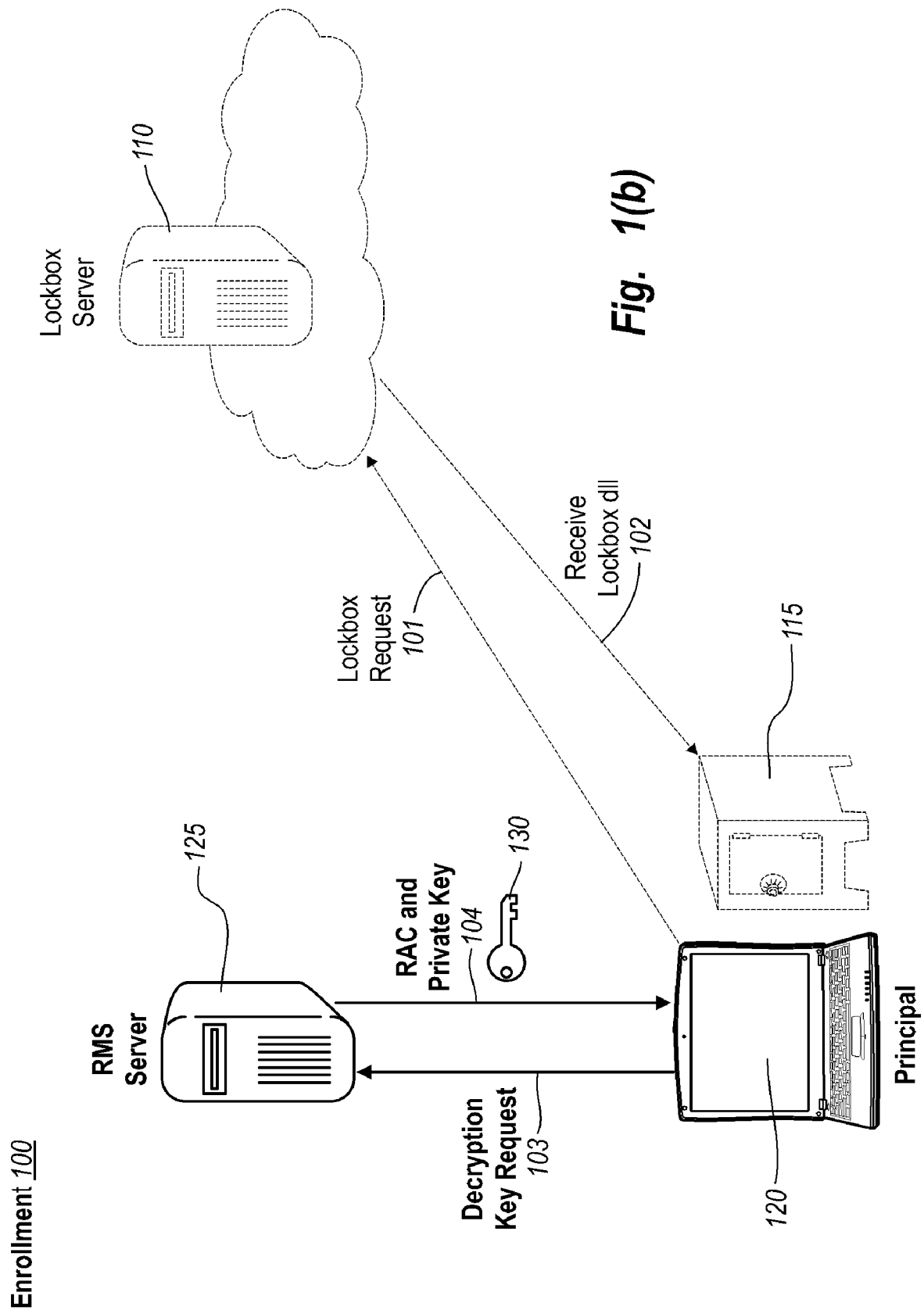
FIG. 1(b) illustrates an example of a user enrollment process for registering with a rights management server.

FIG. 1(b) illustrates an example of how principal, i.e., a user or server, 120 can register with RMS server 125 in the principal enrollment 100 process. First, principal 120 may make a request 103 for decryption keys from the RMS server 125. The principal may identify itself to the RMS server any one of many conventional authentication protocols such as basic, Kerberos, X509 certificates, Passport, etc. The principal 120 will typically receive 104 from the RMS server 125 a rights account certificate (RAC), which may be used to later identify the principal 120 as a trusted participant in the rights management service. The principal 120 also receives a private key 130 from the RMS server 125. The private key 130 is typically encrypted with a key that may be provided in the request 103 to keep it 130 private during transport. The private key 130 may be encrypted with, e.g., the public key of the machine certificate or a key that is in turn encrypted with the public key of the machine certificate. Of course, other well known ways of encryption can be used to keep the private key 130 private; for instance, symmetric key encryption. Accordingly, the above illustration of how the private key 130 is encrypted and how the key to encrypt it 130 is obtained are used for illustrative purposes only and are not meant to limit or otherwise narrow the scope of the invention.

In any event, as described below, the private key 130 will be used by the RMS server 125 to encrypt message keys the principal 120 will use to decrypt protected messages. Accordingly, when principal 120 receives a message that is protected the lockbox dll 115 can verify the message's authenticity, retrieve and decrypt the message key and open the message for the principal 120.

Principal 120 is now ready to participate in the rights management service. Any principal that wishes to participate in rights management either by sending protected messages or in attempting to decrypt protected messages will usually go through a similar user enrollment 100 routine. It should be noted that although a principal sending a protected message must enroll before being able to publish the message (as described in greater detail below), a principal may receive protected messages without being enrolled in the RMS system. Nevertheless, an un-enrolled principal that receives protected messages must enroll before being able to decrypt the protected messages. Accordingly, an un-enrolled principal may be guided to enroll upon attempting to access protected messages.

Figure 2A:
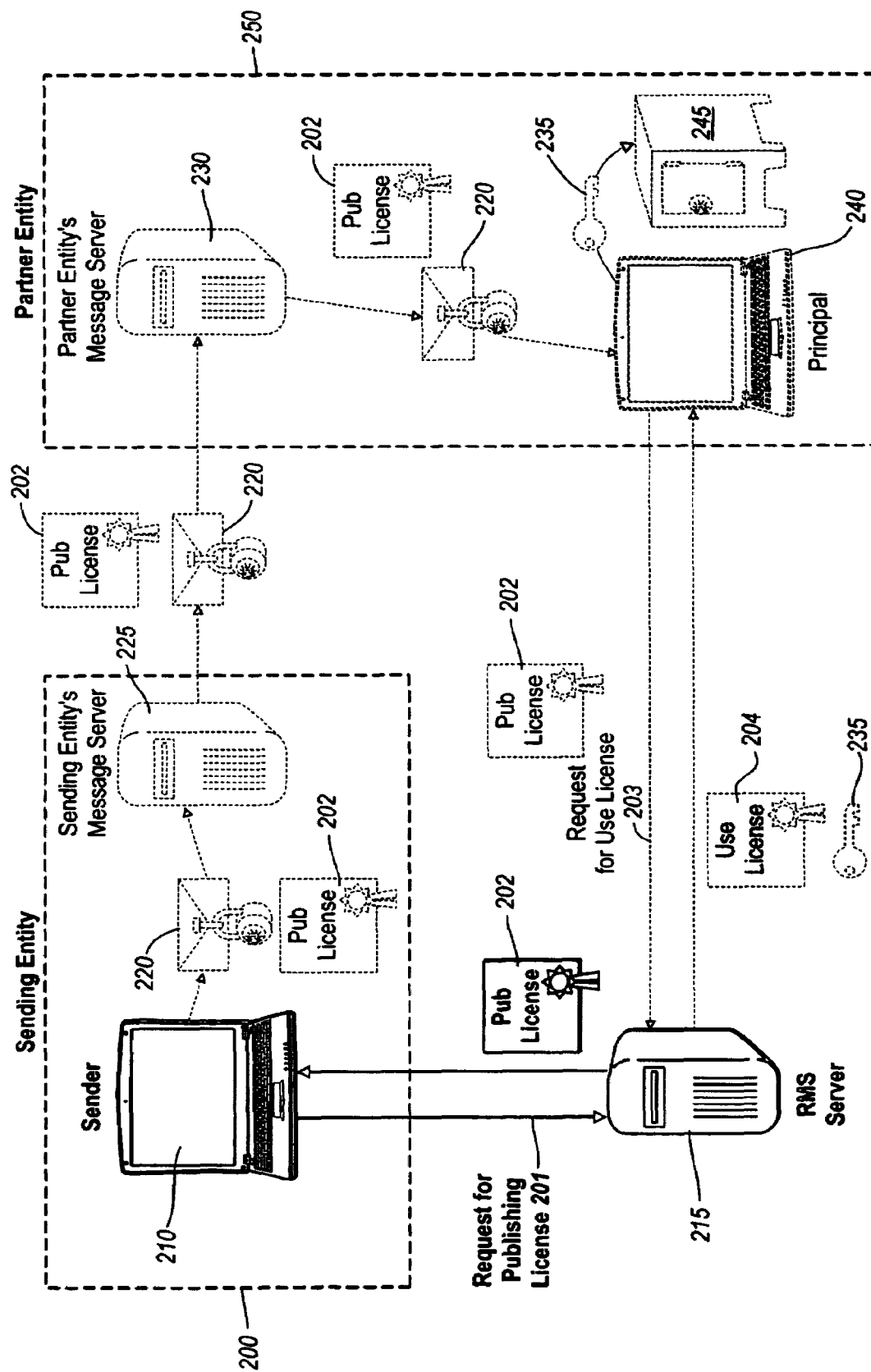
FIG. 2(a) illustrates an example of how a sender may obtain a publishing license from a rights management server for sending protected messages.
Figure 2B:
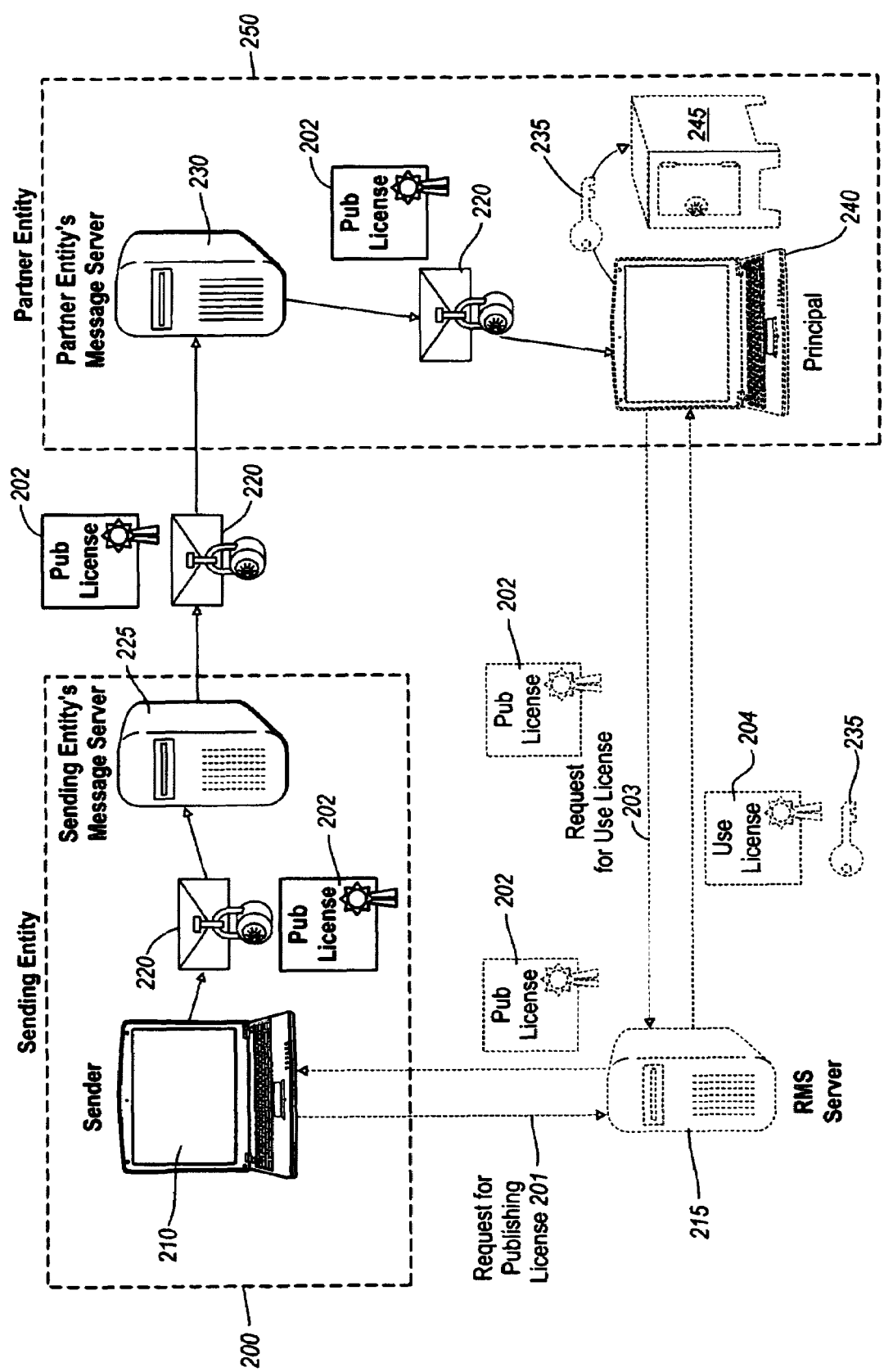
FIG. 2(b) illustrates an example of the process of sending from a sending entity protected messages to principals within a partner entity.
Figure 2C:
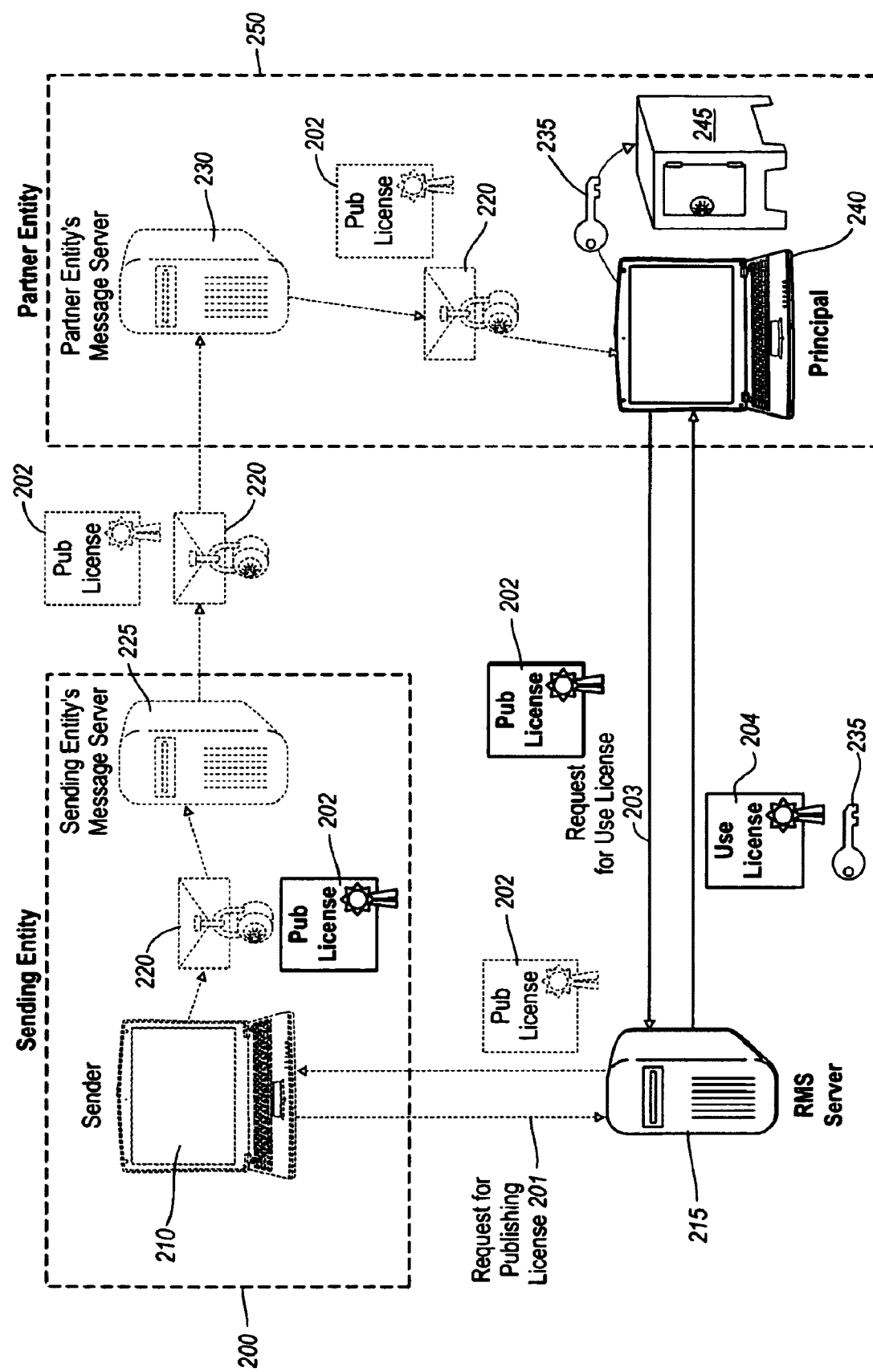
FIG. 2(c) illustrates an example of a process for obtaining a use license from a rights management server for decrypting protected messages received.

FIGS. 2(a)-(c) illustrate an example of how a sender 210 of protected messages within a sending entity 200 and a principal 240 within a partner entity 250 may participate in the rights management process. First, as shown in FIG. 2(a), a sender 210 should obtain a publishing license 202 to send to principal 240 with the protected message 220. Accordingly, sender 210 encrypts the message and makes a request 201 for a publishing license from the RMS 215. (It should be noted that although RMS server 215 is shown outside of sending entity 200, the RMS server 215 could also be part of sending entity 200). This request 201 may include such things as a rights expression, a message key (typically encrypted, e.g., with the RMS server's 215 public key—or the entire request could be encrypted via secure sockets layer (SSL)), a message key identifier, and a hash of the message. The rights expression will typically specify who the protected message is intended for and what each recipient of that message can do. The message key (not shown) is a symmetric key typically created by the sender 210 to be used in encrypting/decrypting the protected message. One embodiment provides that the RMS server 215 may save the message key in a database (not shown), which it will later send to principal 240 in the use licensing process described below. Alternatively, as described in greater detail below, the RMS server 215 may include an encrypted version of the message key in the publishing license 202. Finally, the hash may later be used to verify that the message does not change when received and opened by the respective lockbox dll 245.

After receiving a request 201 for a publishing license, the RMS server 215 may then create a publishing license 202, which may be encrypted information signed by the RMS server. The information may simply be any combination of the rights expression, the encrypted message key, message key identifier, and/or hash of the message. Accordingly, when the RMS server 215 later receives the publishing license 202 and a request for a use license 203 (described below) the RMS server 215 can be assured that it was the one who created the publishing license 202.

As mentioned above, the RMS server may either store the message key or include an encrypted version of the message key in the publishing license 202, or both. If the RMS server stores the message key, the RMS server uses a message key identifier to locate the message key in its database when issuing a use license, as described herein after. Alternatively, the publishing license 202 includes the message key encrypted, e.g. to the RMS server's 215 public key. The RMS server may later decrypt the message key when issuing a use license in accordance with embodiments described below. In any event, when the term message key, encrypted key, or the like is used in various embodiments and should be broadly construed to include an identifier for the message key, an encrypted version of the message key, or any other means used in identifying and obtaining a message key.

In any event, sender 210 receives the publishing license 202, which it can now attach to the protected message 220 to send to principal 240 within partner entity 250. This is typically a one time operation, usually done the first time the sender attempts to send protected message. FIG. 2(b) illustrates a high level overview of how a protected message 220 and the publishing license 202 may be sent from sending entity 200 to a principal 240 within partner entity 250. The sender 210 or a server or other device within the sending entity 200 may simply attach the publishing license 202 to the protected message 220 and forward it to its message server 225. The sending entity's message server 225 then finds the appropriate partner entity's message server 230 and forwards the protected message 220 and the publishing license 202 to the partner entity's message server 230. When the principal 240 connects to its message server 230 the partner entity's message server 230 sends the protected message 220 and the publishing license 202 to the principal 240.

In should be noted that although the above and following message servers (e.g., sending entity's message server 225 and partner entity's server 230) have been and will be shown and described as single units, these message servers may comprise any number of servers. For example, these message servers may include intermediary servers, edge servers, proxy servers, exchanger servers, or any other type of server used in the processes of sending and receiving messages. Accordingly, even though example embodiments of the present invention are described in the context of a single message server unit, the term message server should nevertheless retain a broad interpretation to describe any one or multiple servers used in receiving messages or other similar type data.

In any event, the principal 240, or even the partner entity's server 230 (or other similar proxy), may recognize the messages as protected and attempt to obtain a use license 204 from the RMS server 215. FIG. 2(*c*) illustrates the process that principal 240 or proxy may go through in order to obtain a use license 204 when principal 240. First, the principal 240 can make a request for a use license 203 from the RMS 215. Typically, the request for the use license will include the publishing license 202 and the principal's 240 RAC, which the RMS 215 uses to verify that the principal 240 is an authorized user.

Once the RMS server 215 verifies the authenticity of the publishing license 202 and the principal's 240 identity, it can send the use license 204, which includes message key 235, to principal 240. Of course, as previously described, the message key can either be stored in a database of the RMS server 215, or it may be included in the publishing license in encrypted form. When sent in the use license 240, the message key 235 should be encrypted to the principal's private key (not shown), which was previously obtained in the registration process and stored in lockbox 245. Accordingly, when the principal 240 receives the use license 204 containing the encrypted message key 235 it can provide the use license 204 to the lockbox 245. For instance, an application (not shown) that will use the decrypted message may provide the encrypted message and use license 204 to lockbox 245.

To ensure that the application is trustworthy to handle the decrypted message, the application must be certified and must present such certification to the lockbox along with the use license 204. Lockbox 245 may then uses the private key created in the registration process to decrypt the message key 235, and subsequently use the message key 235 to decrypt the message that is protected 220. Lockbox 245 can then provide the decrypted message over to the appropriate application along with the restrictions that were defined in the publishing license 202 and/or use license 204 to place the appropriate restrictions on the protected message.

Figure 3A:
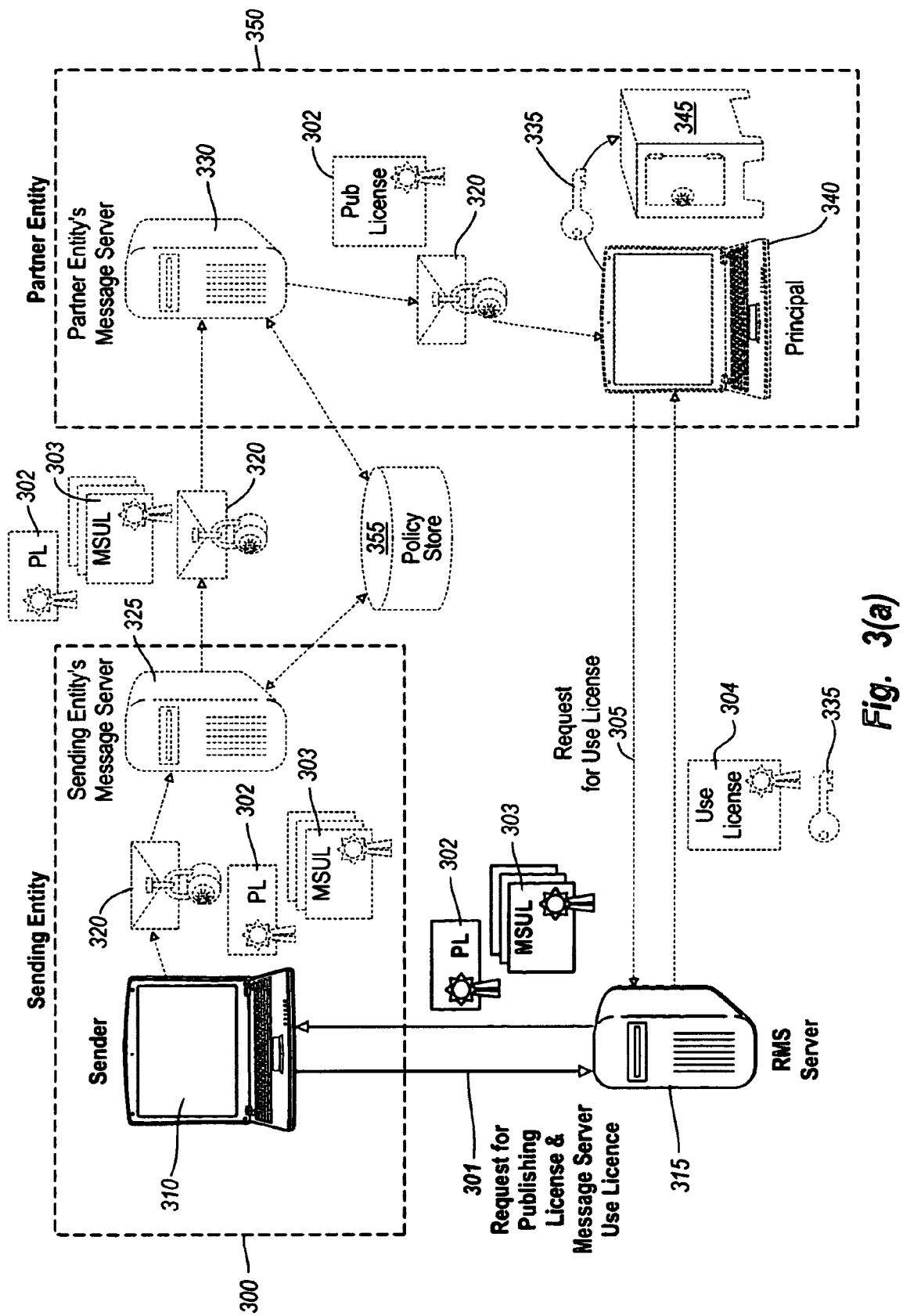
FIG. 3(a) illustrates an example of a principal within a sending entity requesting and receiving a publishing license and message server use license from a rights management server in accordance with example embodiments.

When either entity wishes to compare or enforce message policies, i.e., the operations that are to be performed on the protected message before sending, receiving, or allowing access to protected messages, example embodiments provide for an exchange, comparison and enforcement of such policies. The following description along with FIGS. 3(*a*)-(*c*) illustrates how trusted partner entities (i.e., entities that are external to one another, but have established a trusted relationship) may use and exchange message policy information when transferring messages.

Referring to FIG. 3(*a*), and similar to the publishing process described above regarding FIG. 2(*a*), a sender 310 enrolled in the rights management services and wishing to send protected message can request a publishing license 301 from a RMS server 315. As previously discussed, the request for the publishing license 301 may include a rights expression, message key and hash of the message. The rights expression defines who is authorized to receive the protected message and what they can do with such message. For example, the rights expression may limit a principal's operational rights on the message in re-licensing, printing, copying, forwarding, sharing, delegating or saving the message. Further, the rights expression may include an expiration feature, which limits, e.g. the number of times or a time period the aforementioned rights are available.

As mentioned above, the request for publishing license 301 should also include a message key 335. The message key 335 may be a symmetric key created by sender 310. As will be described below, this message key 335 is used to allow principal 340 access to protected message 320. In addition, to the rights expression and message key 335, the request for publishing license 301 may also include a hash of the message. The hash can be used by the lockbox dll 345 to ensure that the message has not been tampered with or otherwise corrupted.

Example embodiments provide that if either the sending entity's server 325 or the partner entity's server 330 requires the enforcement of policies (e.g., anti-virus scanning, anti-spam filtering, search term indexing, etc.), the sender 310, the sending entity's message server 325, or other principal within the sending entity 300, may further request 301 from the RMS server 315 one or more message server use licenses 303. For example, if sending entity's 300 outbound message policy requires anti-virus scanning, a request 301 for a message sever use license (MSUL) 303 can be made. The request 301 may identify the sending entity's message server 325 and the rights that are needed, e.g., access for anti-virus scanning. Similarly, if partner entity's inbound policy requires scanning of the protected message 320, sending entity 300 can determine this and send a request 301 for a message server use license 303 that identifies the rights (e.g., anti-spam filtering) and the partner entity's message server 330.

Sending entity 300 can determine that partner entity 350 has an inbound (or out bound) message policy by any number of conventional ways. For example, the policies may be published on a policy store 355 such as through a directory service, e.g., DNS, Active Directory, LDAP, XKMS, etc. Alternatively, the sending entity 300 may receive the policies over an SMTP connection between the message servers 325, 330 of the two entities 300,350. The requirements of the inbound policy for partner entity 350 may then evaluated to determine those rights—if allowed by sending entities outbound policy—should be included in the request 301 for the message server use license 303.

As stated above, the request 301 for the message server use license 303 can include the rights available to the server, and the identity of the server as assigned under the RM system. The rights may vary depending on the entity server, as can the identity required to be presented. For example, because sending entity's message server 325 is within the entity 300 sending the protected message 320, it can have unlimited access to the protected message. In addition, the internet protocol address of the sending entity's message server 325 may be enough to identify it to the RMS server 315.

Partner entity's message server 330, on the other hand, may only have limited access to the protected portion of message 320, and will typically need to be identified by a RAC. Of course, because every principal that participates in RM are issued RACs, which as previously mentioned are digital certificates issued to each user by RMS server 315, the sending entity's message server 325 may be identified by its RAC as well. Alternatively, servers can be authenticated by means other than certificates, such as basic HTTP, Windows NTLM, Kerberos, X509 certificate, Passport, etc.

It should further be noted that trusted entities (e.g., sending entity 300 and partner entity 350) may have a tightly trusted relationship. In such instances, servers within both entities, similar to servers owned by the individual entities, may have special privileged identities under the RM system that automatically grants them the access rights required for the functions they perform for enforcing their message policies. Accordingly, the rights may not be included in the request 301 nor in the message server use license 303, as described below.

Once the RMS server 315 receives the identity of the entity servers and the rights available to each, the RMS server 315 can generate the appropriate message server use licenses 303. As one would recognize, this message server use license 303 can be different from the use license 304 used by the end principal 340 to consume the content. For example, unlike an end use license 304 that the principal 340 has to request 305 from RMS server 315, partner entity's message server 330 receives the message server use license 303 without having to make any such request. Further, the rights within each license may be different because of the different purpose for using the licenses (e.g., the message servers 325, 330 use the message server use license 303 for scanning and enforcing policies whereas the principal 340 uses the use license 304 to consume the content).

Similar to the use license 304, however, the message server use licenses 303 may include the rights that are available to the appropriate entity's message server (with the possible exception of the special privileged cases described above), as well as the message key 335 encrypted to correspond with the identity of the entity's message server. For example, the message key 335 may be encrypted to the public key of the entity's message server. As an alternative, a symmetric key that is shared only between the RMS server and the corresponding entity's message server may also be used. Of course, other well known techniques for sharing encrypted keys are also available. Accordingly, the above methods for distributing encrypted keys are used for illustrative purposes only and are not meant to limit or otherwise narrow the scope of the present invention.

In yet another example embodiment, the message server use license 303 may be valid for only a limited duration or use (e.g., limited number of times), or may be made valid indefinitely based on the policies of the different entities 300, 350. For example, sending entity 300 may have a policy that limits the number of times or the time period the message server use license 303 may be used in order to have tighter control over its 303 use. Partner entity 350, however, may, e.g., wish to have the ability to update such things as virus scanning and apply such to the previously stored message 320. In such instance, the message server use license 303 could be valid for an indefinite or extended period of time.

Other example embodiments provide, however, the ability to extend the validation of the license 303 upon expiration. For instance, if an entity needs to access message 320 when message server use license 303 has expired, the present invention provides for a way to request an extension for the license 303. Such extension could be requested, e.g., from the partner entity 350 just prior to or after expiration. Alternatively, the sending entity 300—knowing that partner entity's 350 policy requires indefinite or extended use of the license 303—could recognize that the license 303 has or is about to expire. In such instance, the sending entity 300 may, e.g., make a request for and send a new message server use license 303 to partner entity 350. Of course, other well known ways of extending the validity period of license 303 upon expiration could be used. Accordingly, the above examples for extending the validation of message server use license 303 (as well as the policy reasons for doing so) are used for illustrative purpose only and are not meant to limit or otherwise narrow the scope of the present invention.

Along with the message server use license 303, RMS server 315 can take at least a portion of the information provided in the request 301 for a publishing license and sign it to create publishing license 302. As previously discussed, the information provided may be any combination of the rights expression, message key 335, and/or hash of the message that is signed and encrypted to produce the publishing license 302. As mentioned above, example embodiments provide that after receiving the request for the publishing license 301, RMS server may either store the message key 335 in a database or include an encrypted version of the message key 335 in the publishing license 302. Publishing license 302 may then be provided to the sender 310, sending entity's message server 325, or other principal within sending entity 300 for distributing protected messages. The publishing license 302 and one or more message server use licenses 303 are sent to the sending entity 300 for internal and external use.

Figure 3B:
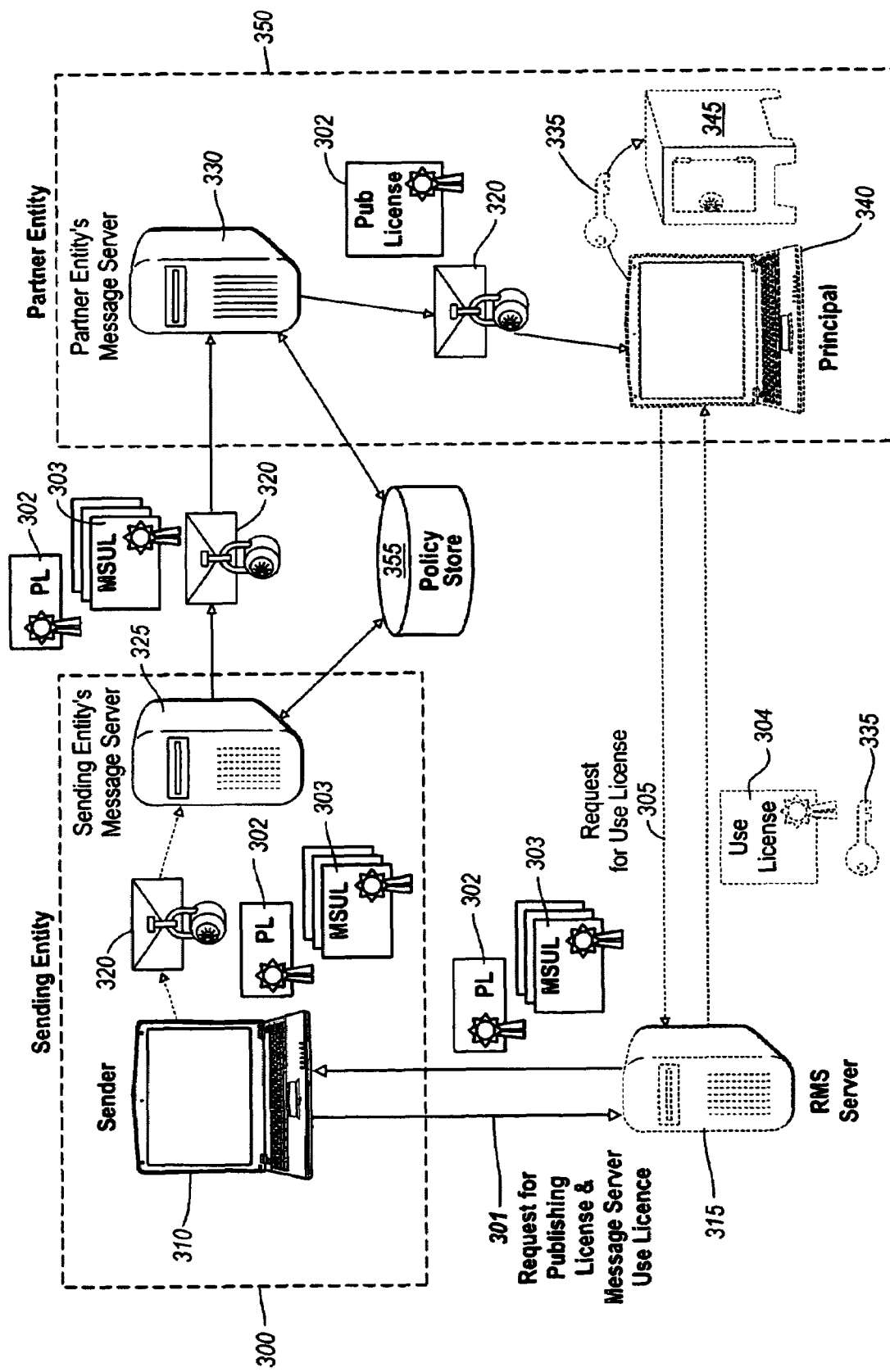
FIG. 3(b) illustrates an example of a sending entity sending a protected message, a publishing license and a message server use license via its message server to a partner entity's message server in accordance with example embodiments.

FIG. 3(b) shows the transfer and use of the protected message 320, publishing license 302 and the one or more message server use licenses 303 between sending entity 300 and partner entity 325. Once sending entity's message server 325 receives (either directly from the RMS server 315, or indirectly from e.g., sender 310) protected message 320 and the corresponding message server use license 303, it can implement sending entity's outbound message policies. For example, if anti-virus scanning is desired, sending message server 325 may access protected message 320 using its corresponding message server use license 303 and scan the message 320 for viruses. If no viruses are discovered, the message 320, public license 302, and any corresponding message server use license 303 may be made available to the partner entity 350 for use and distribution accordingly.

Although the partner entity's message server 330 (or even sending entity's message server 325) will typically not have a lockbox dll per se, partner entity's message server 330 may contain a server version of the RMS lockbox that decrypts protected messages, parses rights statements (licenses), validates the security of the operating environment (to make sure the server hasn't been hacked), and manages keys, e.g., the message server's private key. Unlike the principal lockbox dll 345, however, the server code is not necessarily downloaded from lockbox server 110. Instead, it may be installed on the partner entity's message server 330 with the messaging software. The message server may, however, receive a machine certificate from the lockbox server or RMS server.

Prior to transferring of this information, however, example embodiments allow for the comparison of policies between the trusted entities 300, 350 to determine compatibility. For example, embodiments provide that when sending entity's message server 325 (or other appropriate principal within the sending entity) retrieves partner entity's 350 inbound message policies to determine rights that to be included in request 301, a comparison of the policies allowed by sending entity can be made to determine if a request 301 should be made.

For instance, if partner entity's 300 inbound message policies require scanning of messages, but sending entity's 300 message policies do not authorize scanning of protected messages, then the two policies are incompatible. As such, there is no need to request a message server use license 303, nor to send the protected message 320 or publishing license 302 to partner entity 350. An error may also be raised to the sender 210 to indicate such incompatibility. Of course if the policies are compatible, the message 320, publishing license 302 and message server use license 303 may be made available to the partner entity 350. Similarly, partner entity 350 may retrieve sending entity's 300 policies and compare them with its partner entity's 350 inbound policies to determine how partner entity 350 is to treat message 320 (e.g., accept, ignore, etc.)

As previously mentioned, the message policies for entities 300, 350 may be published on policy store 355, which may be a directory service, e.g., DNS, Active Directory, LDAP, XKMS, etc. Alternatively, the message policies may be received over an SMTP connection between the message servers 325, 330 of the two entities 300, 350. In another embodiment, the message policies of the corresponding entities 300, 350 do not need to be published on policy store 355 nor sent via a secure connection. Instead, the corresponding entity server 325, 330 can simply reject non-conforming protected messages 320.

Figure 3C:
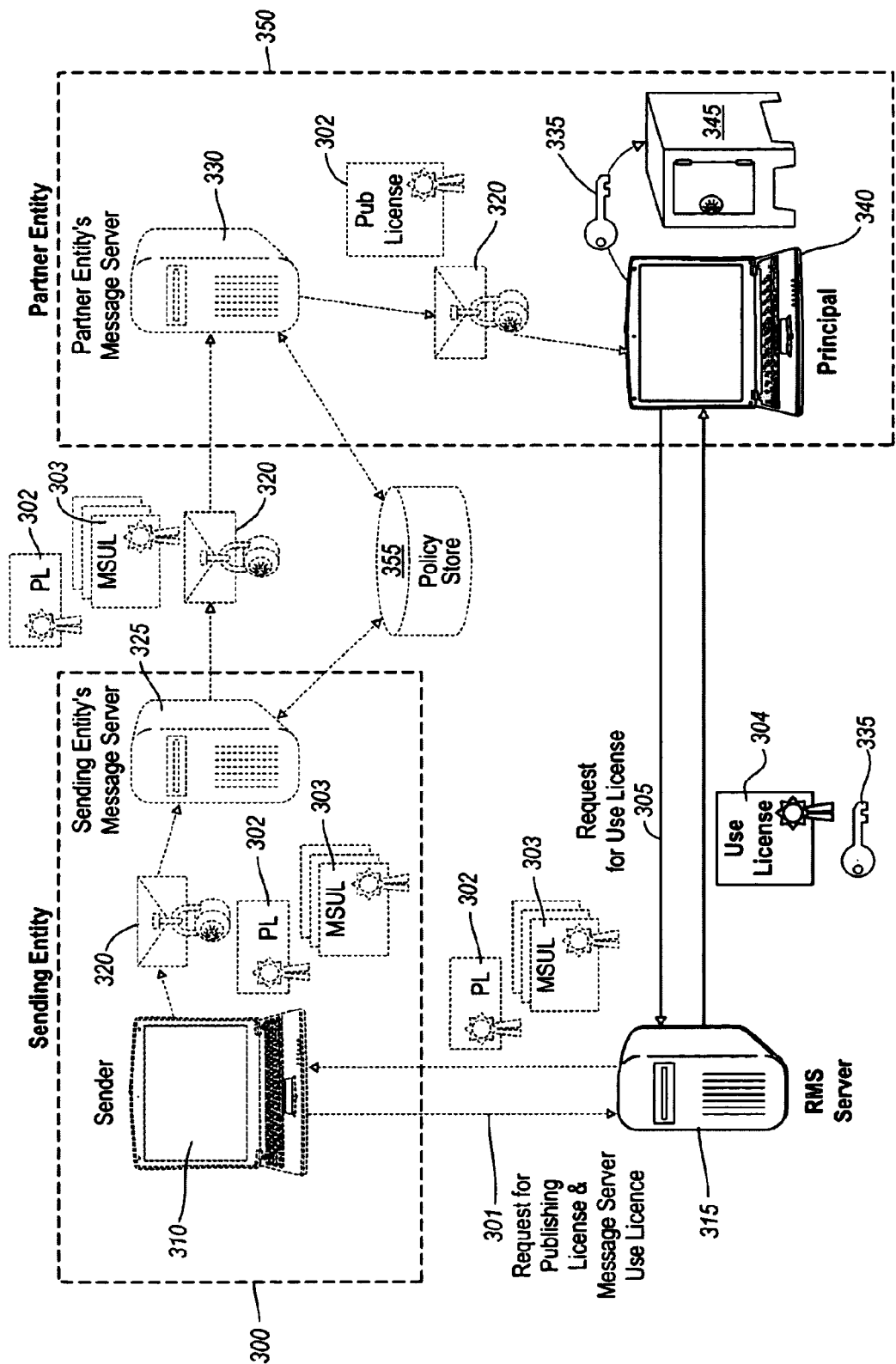
FIG. 3(c) illustrates an example of a process for obtaining a use license from a rights management server for decrypting protected messages received.

If the policies are compatible, and if the protected message 320 conforms to the policies of the partner entity 350, then the message is accepted by the partner entity's message server 330 and made available to the intended principals 340. Accordingly, as shown in FIG. 3(c), principal 340 can make a request 305 and receive and use license 304 in accordance with the process described above with regard to FIG. 2(c). The principal 340 can then access the protected message 320 and be assured that it has been received securely and safely.

The present invention may also be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

FIGS. 4-7 illustrate various acts of and steps for in accordance with example embodiments. The following description of these Figures will occasionally refer to corresponding elements from FIGS. 3(a)-3(c). Although reference may be made to a specific element in FIGS. 3(a)-3(c), these are used for illustrative purposes only and are not meant to limit or otherwise narrow the scope of the present invention.

For example, as shown in FIG. 4, method 400 includes an act of 410 receiving protected data. The data may be received at any principle within an entity. For example, the data may be received by either sending entity's message server 325 of partner entity's message server 330. Further, the data may include a message 320 with a protected portion controlled by a rights management server, a publishing license and a message server use license. The protected portion of the message 320 may be one of a protected contact, document, attachment, calendar item, meeting request, etc. The publishing license 302 may define one or more principals' (e.g., principle's 340) rights to the protected portion of the message, and the message server use license 303 may include an encrypted key that corresponds to an entity's message server, e.g., sending or partner entity's message servers 325, 330.

Further method 400 includes an act of 420 using the message server use license. The license can be used to access the protected portion of the message 320 for performing operations on the protected portion in accordance with message policies defined by the entity. Such policies may include, e.g., anti-virus scanning, anti-spam filtering, search term indexing, etc. If the protected portion of the message 320 conforms to the message policies defined by the entity, e.g., sending entity 300 or partner entity 350, method 400 further provides the act of 430 making the message and publishing license available to the one or more principals.

The above operations may be performed by a sending entity's server 325 before sending the message 320 and the publishing license 302 to a partner entity 350. Alternatively, or in conjunction, the operations may be performed by a partner entity's server 330 when receiving the message 320 from a sending entity 300. Other embodiments, as described below allow for the comparison of policies between the entities 300 and 350 to determine compatibility. As previously mentioned such policies can be stored in a directory (e.g., policy store 355) and formatted using XrML. Alternatively, these policies can be transferred between entities 300 and 350.

FIG. 5 illustrates a method 500 for generating a message server use license 303 in accordance with example embodiments. The method 500 includes an act of 510 receiving a request for a message server use license 303. The message server use license 303 identifies an entity's message server (e.g., 325 or 330). Further, method 500 may include a step for 520 allowing an entity access to a protected portion of a message 320. Access to the message 320 is allowed when performing operations on the message in accordance with message policies defined by the entity (e.g., sending entity 300 or partner entity 350). The step for 520 may include: (1) a corresponding act of 523 receiving a key (e.g., message key 335) that allows access to the protected portion of the message 320 controlled by a rights management server 315; (2) a corresponding act of 525 encrypting the key 335 to correspond with the entity's message server (e.g., 325, 330); and (3) a corresponding act of 527 generating a message server use license 303 that includes the encrypted key 335.

The above operations with reference to method 500 may be performed by a rights management server (e.g., RMS server 315) external from the sending entity 300. Alternatively, the functions may be performed by an server internal to the sending entity 300, e.g., sending entity's message server 225.

FIG. 6 illustrates a method 600 of requesting and receiving a message server use license 303 in accordance with example embodiments. The method 600 includes an act of 610 receiving a protected message 320. The protected portion of the message 320 being controlled by a rights management server 315.

Method 600 also includes an act of 620 receiving a publishing license 302. The publishing license may define rights available to one or more intended principals (e.g., principle 340). The rights within the publishing license 302 controlling the type of operations that can be performed on the protected portion of the message 320. Moreover, the method 600 may include an act of 630 receiving message policies. The message policies are defined by an entity (e.g., sending entity 300 or partner entity 330) and specify the operations that are to be performed on the message 320.

Method 600 also provides an act of 640 requesting and receiving 650 a message server use license 303. The request and receipt can be made by a principle within sending entity 300, e.g., sending entity's message server 325, sender 300, a proxy server (not shown) etc. The message server use license will allow the entity's message server (e.g., 325, 350) access to the protected portion of the message. The requested message server use license 303 includes an encrypted key that corresponds to the entity's message server (e.g., 325, 330).

Finally, method 600 includes an act of making the message 320, publishing license 302 and message server use license 303 available to the entity's message server 325, 330. This will allow the entity's message server 325, 330 to enforce the message policies defined by the entity 300, 350.

FIG. 7 illustrates a method 700 of determining if a message can be transferred between two trusted entities (e.g., sending entity 300 and partner entity 350) in accordance with example embodiments. Method 700 includes an act of 710 receiving a sending entity's 300 message policy. The message policy defines the type of operations that a partner entity 350 is allowed to perform on a protected message 320. For example, the policy may allow for such things as scanning for viruses, but not allow for scanning for spam filtering. Other limitations may also apply.

In any event, method 700 also includes an act of 720 receiving the partner entity's 350 message policy. The policy defines the type of operations that are to be performed on the message before the partner entity's message server 330 can accept the message 320. For example, partner entity may require anti-virus scanning, anti-spam filtering, but not other operations such as search term indexing.

Method 700 includes an act of 730 comparing the policies. In particular, sending entity's 300 message policy is compared with the partner entity's 350 message policy. Based on the comparison, method 700 includes an act of 740 determining if the policies are compatible. The determination is made to see how each entity's message server 325, 330 will handle the message 320. For example, if sending entity's message server does the comparison, and it is determined that the policies are not compatible, it may decide not to request a message server use license or send the message 320 and publishing license 302 to the partner entity 350. It may also issue an error to the sender 310 indicating that the message 320 was not sent. Another example might be if partner entity's message server 330 the receiving and comparison of the policies, and it is determined that the policies are compatible, then the partner entity's message server 330 may accept the message 320. As will be recognized, other similar results, as described above, are available.

Figure 8:
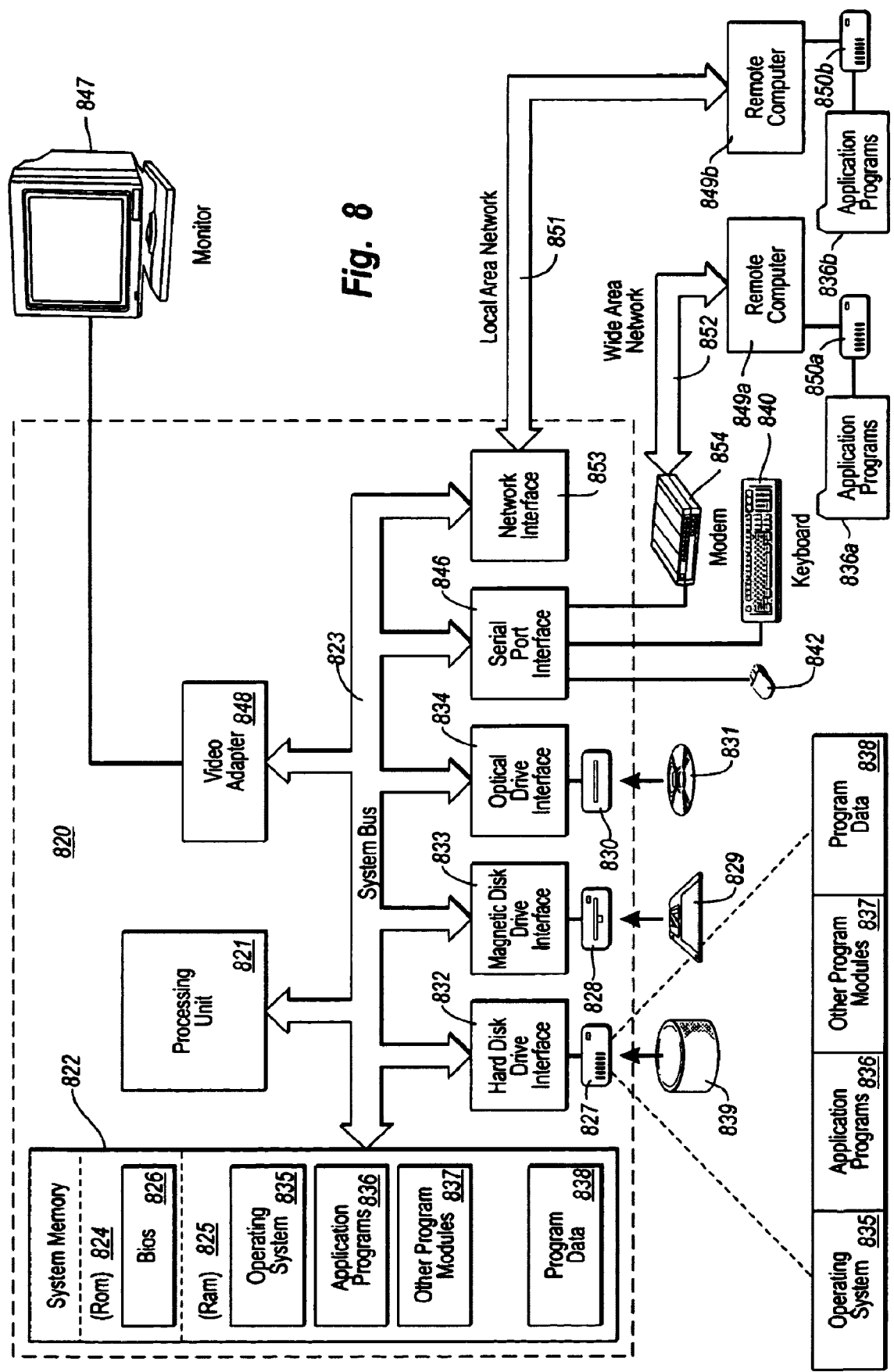
FIG. 8 illustrates an example system that provides a suitable operation environment for the present invention.

FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 8, an exemplary system for implementing the invention includes a general-purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849*a* and 849*b*. Remote computers 849*a* and 849*b* may each be another personal computer, a server, a router, a network PC, a peer device or other common network node, and typically include many or all of the elements described above relative to the computer 820, although only memory storage devices 850*a* and 850*b* and their associated application programs 836*a* and 836*b* have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a rights management system for protecting messages transferred between two trusted entities from unauthorized access, a method of determining if the messages can be transferred based on each others message policies, the method comprising acts of:
   receiving a sending entity's message policy, which defines the type of operations that a partner entity is allowed to perform on a protected portion of a message;
   receiving the partner entity's message policy, which defines the type of operations that are to be performed on the message before the partner entity's message server can accept the message;
   comparing the sending entity's message policy with the partner entity's message policy; and
   based on the comparison, determining if the policies are compatible for transferring the message between the sending and partner entities' message servers.

2. The method of claim 1, wherein the message policies are chosen from one or more of an anti-virus scanning, an anti-spam scanning and search term indexing.

3. The method of claim 2, wherein the policies are received and compared at the sending entity's server for determining if the message should be transferred from the sending entity's server to the partner entity's message sever.

4. The method of claim 2, wherein the policies are received and compared at the partner entity's server for determining if the message should be accepted when transferred from the sending entity's server to the partner entity's message sever.

5. The method of claim 2, wherein the sending entity receives the partner entity's message policies from a directory service.

6. The method of claim 5, wherein the format of the received partner entity's message policies is XrML.

7. The method of claim 5, wherein the directory service is one of a DNS, Active Directory, LDAP, XKMS, or UDDI.

8. The method of claim 2, wherein the sending entity receives the partner entity's message policies from the partner entity over a SMTP connection.

9. In a rights management system for protecting messages transferred between two trusted entities from unauthorized access, a computer program product for implementing a method of determining if the messages can be transferred based on each others message policies, the computer program product comprising one or more computer readable media having stored thereon computer executable instructions that, when executed by a processor, can cause the system to perform the following:
   receive a sending entity's message policy, which defines the type of operations that a partner entity is allowed to perform on a protected portion of a message;
   receive the partner entity's message policy, which defines the type of operations that are to be performed on the message before the partner entity's message server can accept the message;
   compare the sending entity's message policy with the partner entity's message policy; and
   based on the comparison, determine if the policies are compatible for transferring the message between the sending and partner entities' message servers.

10. The computer program product of claim 9, wherein the message policies are chosen from one or more of an anti-virus scanning, an anti-spam scanning and search term indexing.

11. The computer program product of claim 10, wherein the policies are received and compared at the sending entity's server for determining if the message should be transferred from the sending entity's server to the partner entity's message sever.

12. The computer program product of claim 10, wherein the policies are received and compared at the partner entity's server for determining if the message should be accepted when transferred from the sending entity's server to the partner entity's message sever.

13. The computer program product of claim 10, wherein the sending entity receives the partner entity's message policies from a directory service.

14. The computer program product of claim 13, wherein the format of the received partner entity's message policies is XrML.

15. The computer program product of claim 13, wherein the directory service is one of a DNS, Active Directory, LDAP, XKMS, or UDDI.

16. The computer program product of claim 10, wherein the sending entity receives the partner entity's message policies from the partner entity over a SMTP connection.

* * * * *